Figure 1:
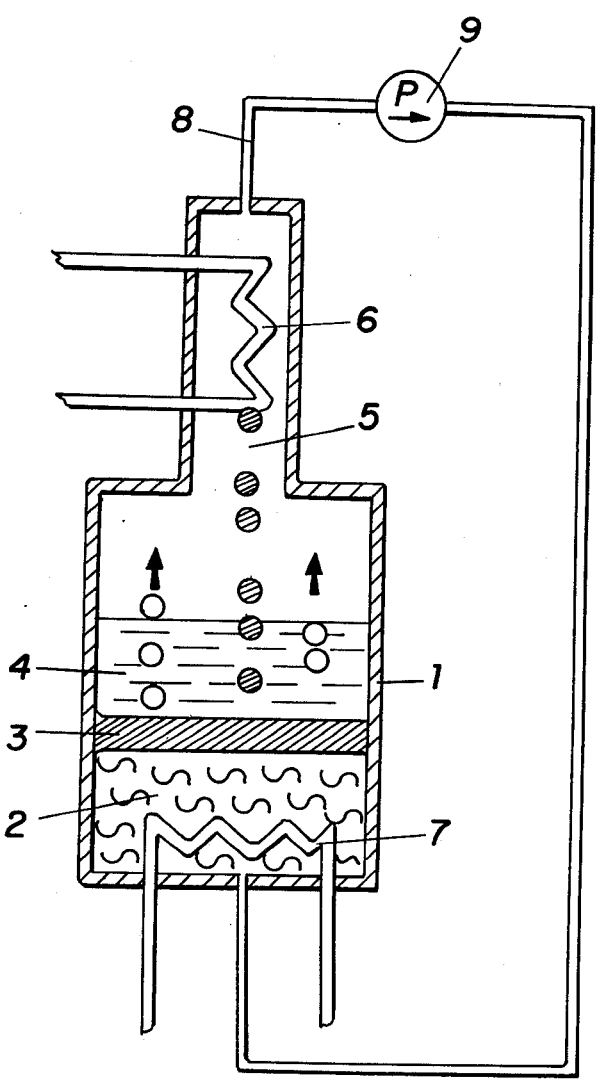

United States Patent [19]

Carlsson et al.

[11] Patent Number: 4,466,478
[45] Date of Patent: Aug. 21, 1984

[54] METHOD AND APPARATUS IN STORING HEAT

[76] Inventors: Bo Carlsson, Murkelvägen 118; Hans Stymne, S. Skogsrundan 21, both of S-18400 Åkersberga; Gunnar Wettermark, Lundblads väg 12, S-18233 Danderyd, all of Sweden

[21] Appl. No.: 253,762
[22] PCT Filed: Aug. 19, 1980
[86] PCT No.: PCT/SE80/00212
§ 371 Date: Apr. 2, 1981
§ 102(e) Date: Apr. 2, 1981
[87] PCT Pub. No.: WO81/00574
PCT Pub. Date: Mar. 5, 1981

[30] Foreign Application Priority Data

Aug. 22, 1979 [SE] Sweden ................................. 7907021

[51] Int. Cl.³ .............................................. F28D 21/00
[52] U.S. Cl. ........................................... 165/1; 165/10; 165/104.17; 165/111
[58] Field of Search ................. 165/10, 1, 111, 104.11, 165/104.17

[56] References Cited

U.S. PATENT DOCUMENTS 4,129,014 12/1978 Chubb ....................... 165/104.11 X
4,263,961 4/1981 Morawetz et al. .............. 165/111 X
4,286,650 9/1981 Lindner ......................... 165/111 X

FOREIGN PATENT DOCUMENTS 28436 3/1979 Japan .............................. 165/104.17

Primary Examiner—Albert W. Davis, Jr.
Attorney, Agent, or Firm—Birch, Stewart, Kolasch & Birch

[57] ABSTRACT

The invention relates to a method and apparatus for storing heat in a heat-of-fusion storage medium, e.g. a salt hydrate, and the heat exchange and mixing in conjunction with the taking of heat from the storage medium. In a closed system including a vapor chamber (5) and a chamber for a solid/liquid phase, the storage medium (2, 4) is brought into direct contact with a substance, i.e., a heat transfer medium (3) having the capacity of taking up heat from the storage medium by being vaporized. The vapor travels to the vapor chamber (5), and when heat is removed from the vapor, the vapor is caused to condense and the condensate returns to the storage medium. The substance has insignificant solubility in the storage medium and a density which is higher, or equal to the density of the storage medium in its liquid phase. Suitable combinations of storage medium and substance include calcium chloride hexahydrate and trifluorotrichloroethane or Clauber's salt and octafluorocyclobutane.

8 Claims, 3 Drawing Figures

METHOD AND APPARATUS IN STORING HEAT

The present invention relates to a method of forming heat exchange and mixing in a system for storing and taking out heat by melting and crystallization of one or more chemical compounds. The invention also relates to an apparatus for carrying out the method.

The utilization of the fusion heat in chemical compounds for storing energy affords large advantages, and a number of systems for this purpose are known from the literature. Compounds melting at temperatures slightly above room temperature (30°–40° C.) are particularly interesting for heating dwellings. In the use of solar heat or heat pump systems, substantially higher system efficiencies and storage densities are generally obtained than what would be the case if water, for example, were used as the heat storage medium.

Several easily obtainable salt hydrates, e.g. $Na_2SO_4.10H_2O$ (Glauber's salt) and $CaCl_2.6H_2O$, have appealing characteristics in this connection. Salt hydrates are not one-component systems however, which results in the risk of forming undesired phases whereby the reversibility in the fusion-crystallization transitions can be lost, with deteriorated heat storage capacity as a result. The reversibility is most often connected with whether the material melts congruently or incongruently. With incongruent melting two phases of different density occur simultaneously, and the phase separation which thereby can occur generally leads to a complete crystallization transition not being able to take place.

Several methods have been used to prevent or inhibit this type of phase separation. Effective mixing is a method by which the systems can be made to work reversibly.

The same problem can also occur with component systems melting congruently. Concentration gradients can namely occur in the melt and result in a concentration increase of the salt in the bottom of the layer with the risk of forming undesired phases. The concentration gradients can be inhibited by suitably forming the heat exchangers in such a way that a self-convective agitation is achieved in the system. In some applications it would however be desirable with another type of mixing.

The heating power in charging and taking off energy in a heat-of-fusion store is determined by the melting and crystallization rate, which can most often be made completely independent of the heat transport to and from the store by suitable dimensioning of the heat exchanger. During melting, the transport of heat is limited mainly by convection in the liquid phase, and will thereby become more effective than during the crystallization, when heat transport is generally made more difficult by the heat exchanger being covered all the time by the solid phase formed. To reach a good rate of heat transfer when taking off heat, it is therefore required that either the heat exchanger surface is very large or that it can be kept free from salt crystals. The simplest way of providing large heat exchanger surfaces is to encapsulate the storage medium in smaller units. The encapsulating material itself can then constitute a heat exchanger. The method is expensive however, and therefore less suitable for large units which are adapted to storing heat during a long period of time.

Another method of ensuring large heat exchanger surface is to apply the principle of direct heat exchange liquid-liquid and use a liquid as heat transfer medium which is not miscible with the storing medium but can be brought into intimate contact with the latter even so. The principle was applied by Etherington as early as 1957 (T. L. Etherington: "Heating, Piping and Air Conditioning", p. 147, Dec. 1957). As a heat transfer medium he used a light mineral oil which in a dispersed form was pumped in from the bottom of a heat store comprising an aqueous solution of disodium hydrogen phosphate. At the same time as he obtained a large heat exchanger surface, he also achieved an effective mixing in the storage medium in this way. Later attempts with other salts have shown that the method has many advantages, but pumping oil round can be associated with problems. Thus, there is the risk that the circulation can be blocked by growing salt crystals or that the oil emulsifies and thereby gives rise to the salt solution being transported round in the outer system. A principle disadvantage with the method is that the heat exchange requires considerable temperature drop due to the pumping speed of the oil not being able to be put to high.

The object of the present invention is to provide a method for heat exchange to a heat-of-fusion storage system, requiring small temperature differences and simultaneously allowing simple regulation of the power output.

A further object of the invention is to enable the use of incongruently melting salts for storing heat by ensuring that equilibrium is maintained with the aid of effective mixing in the salt system. In certain applications, mixing is necessary for congruently melting systems also. According to the invention, this is provided by a method and an apparatus having the distinguishing features disclosed in the patent claims.

In accordance with the inventions, there is added to the heat-of-fusion storage medium a substance (heat transfer medium) which on crystallization takes up heat from the storage medium by vaporization. This heat is subsequently given off by reflux condensation of the vapor. This substance is then recycled in condensed form to the storage medium. The substance will have minor solubility in the heat storage medium, and its condensed phase will have a density which is equal to, or greater than the density of the liquid phase of the heat storage medium. The gas phase will substantially comprise the vapor of the added substance, whereby boiling and thereby mixing is achieved in the storage medium. Among suitable heat storage media and substances there can be mentioned such combinations of salt hydrates and halogenized hydrocarbon as: calcium chloride hexahydrate ($CaCl_2.6H_2O$) and trifluorochloroethane (Freon®113, Frigen®113, F 113); calcium chloride hexahydrate and bromochlorodifluoromethane (C $BrClF_2$, Frigen®12 B 1); Glauber's salt and octafluorocyclobutane ($C_4F_8$) etc.

The heat storage medium and substance (heat transfer medium) are brought into direct contact with each other in a closed system including a vapor space and space for the solid/liquid phase. When the substance is vaporized, it goes over to the vapor space and the mixing effect is achieved in the liquid phase of the storage medium. When heat is taken out of the system the vapor is caused to condense, which can occur against the walls of the vapor space, or in a reflux condenser placed in the vapor space. The vapor space can have an optional form and also include a conduit through which vapor is transported to a condenser, or the like, situated at a distance from the storage medium. In a corresponding way, the condensate can be recycled to the storage medium via a separate conduit. Heat can be supplied to the system via its walls, or through a heat exchanger placed in the storage medium.

According to one embodiment of the invention, the vapor is compressed before it is condensed, whereby heat can be taken out at a higher temperature than that prevailing in the heat storage medium. This can be done by placing a gas compressor in a gas conduit connecting the heat storage medium to the condenser, and a separate return conduit containing a throttle valve is used for recycling the condensate to the heat storage medium.

Forming the heat transfer in the mode described, inter alia, by Etherington (see above) is based on the principle of liquid-liquid heat exchage, heat being taken up by a temperature increase of the heat transfer medium. In contradistinction hereto, the present invention is based on the principle of liquid-liquid-vapor heat exchange, whereby heat is taken up by the heat transfer medium being vaporized, i.e. a combination of liquid-liquid heat exchanger and a gas-liquid heat exchanger. Heat is entrapped in the heat transfer medium in the form of vaporization heat, whereby only very small temperature differences are required. Mixing and regulating the power take-out is provided actively in the first case by pumping round oil, or the like. According to the present invention this can be achieved completely passively.

Figure 2:
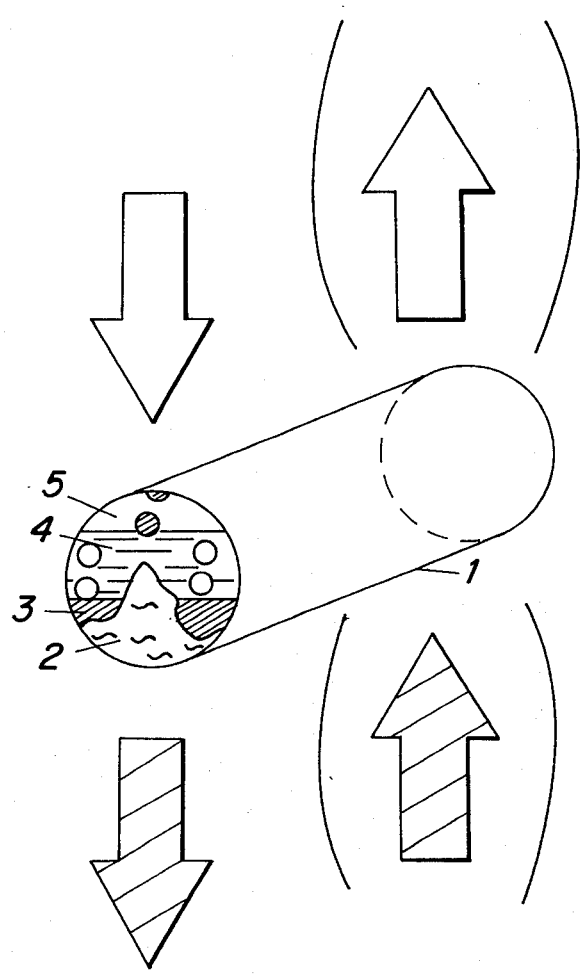
Figure 3:
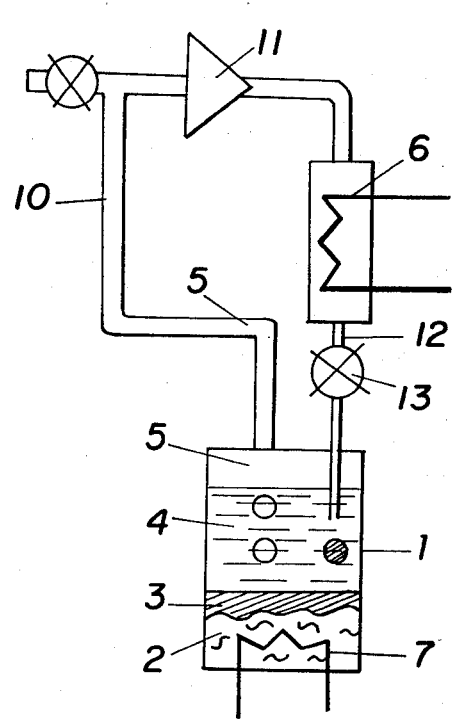

The invention will now be described in the following in conjunction to the attached figures of which FIG. 1 illustrates a first embodiment of the invention, FIG. 2 illustrates a second embodiment and FIG. 3 illustrates an embodiment with compressor.

In the following description, the invention is exemplified with the heat storage medium calcium chloride hexahydrate ($CaCl_2.6H_2O$), to which the substance trifluorotrichloroethane (Freon®113, Frigen®113, F 113) has been added. The selected example does not restrict the general validity of the invention in any way. The heat-of-fusion system calcium chloride hexahydrate is exhaustively described in the document D 12:1978 from the Swedish Council for Building Research, Stockholm (Carlsson—Stymne—Wettermark: "Storage of low-temperature heat in salthydrate melts-calcium hexahydrate"), which is hereby introduced into the description as a reference. $CaCl_2.6H_2O$ melts at 29,7° C. and has a fusion heat equal to 170 J/g. The salt is incongruently melting, since a tetrahydrate ($CaCl_2.4H_2O$) is thermodynamically stable within a temperature interval of 2° C. above the melting point of the hexahydrate. If tetrahydrate formation occurs in a system lacking means for effective mixing, the heat storage capacity decreases successively as a result of the low dissolving rate of the tetrahydrate and the phase separation occurring.

Suppression or elimination of tetrahydrate formation can be achieved by the addition of $Ca(OH)_2$ and $SrCl_2.6H_2O$. In some applications, concentration gradients do occur in the melt, with tetrahydrate formation as a result. Mixing and elimination of the concentration gradients in the melt is achieved by means of the present invention.

A melt of $CaCl_2.6H_2O$ has a density of 1.51 g/ml at 30° C., and the solid phase a densitiy of 1.71 g/ml.

Trifluorotrichloroethane at 30° C. is a liquid with a vapor pressure of 0.55 bar. The latent heat of vaporization is equal to 152 J/g. The substance is only insignificantly soluble in salt solutions, and at 30° C. the liquid has a density of 1.55 g/ml.

FIG. 1 illustrates a closed system comprising a container 1 accommodating a heat store 2, 3, 4 and a vapor space or chamber 5. An upper heat exchanger or reflux condenser 6 for taking off heat is situated in the vapor chamber. A lower heat exchanger 7 for intake of heat is situated in the heat store. A gas conduit 8 leads from the vapor chamber via a pump 9 to the bottom of the container, and opens out in the heat store. Non-condensing gases are circulated via said conduit from the vapor chamber through the heat store. In this way it is ensured that the whole condensor can be utilized effectively for condensing vapor simultaneously as a certain amount of agitation in the heat store is obtained. The container 1 is suitably surrounded by a heat-insulating material (not shown in the Figure). In the heat store there are the following phases layered one above the other, according to their decreasing density: solid phase $CaCl_2.6H_2O$ 2, liquid Frigen 113 3, melt of $CaCl_2.6H_2O$ 4.

When heat is taken off, the Frigen vapor will condense in the reflux condenser 6 and by pressure decrease will thereby cause boiling of the Frigen in the heat store. As an entirety, the heat transport thus requires small temperature differences and is furthermore self-regulating. An effective mixing is also provided in the heat store. When taking in and storing heat in the system by melting the $CaCl_2.6H_2O$, heat is supplied through the heat exchanger 7 at the bottom of the store, whereby boiling Frigen provides mixing and improved heat transfer in the system.

In a trial carried out in a plant according to FIG. 1, 50 kg $CaCl_2.6H_2O$ and 2 l Frigen®113 were charged into the container 1. Heat was supplied for storage by hot water being taken through the heat exchanger 7 until all the $CaCl_2.6H_2O$ had melted. Heat was then taken from the system by cold water being taken through the reflux condenser 6 at a constant flow. The temperature increase of the water was measured. The system working temperature was 30° C. The temperature of the ingoing water was considerably under 30° C. and the flow was selected such that water coming from the condenser was also under 30° C. The system was thus allowed to give full power. It was then found that heat could be taken out at constant full power for about 80% of the time for the crystallization cycle.

The trial was repeated, whereby heat was taken out only by cooling the walls of the container and not the vapor chamber. The output power decreased then during the whole of the crystallization cycle.

FIG. 2 illustrates an apparatus where the primary object is to provide agitation and mixing in the heat storage medium. The storage medium 2, 4 and the substance 3 are encapsulated in enclosed smaller containers 1, e.g. in the form of pipes in which room has been left for a vapor chamber 5. Heat exchange was carried out at both take-off and supply of heat from the outside of the container 1. A reflux condensation was obtained against the walls of the vapor chamber 5. The apparatus can be used, for example, in regenerative heat exchangers where a plurality of containers constitute the heat store of the heat exchanger, and are alternatingly washed over by a hot and cold medium, respectively.

FIG. 3 illustrates an embodiment of the invention where the temperature in the condenser 6 is brought to a level exceeding that in the heat store by the vapor being compressed before it is taken to the condenser. The apparatus differs from the embodiment according to FIG. 2 in that the vapor chamber 5 includes a conduit 10 connecting the heat store to the condenser. A gas compressor 11, in which the vapor pressure is increased before it is taken to the condenser, is placed in the conduit. A separate return conduit 12 for the condensed vapor leads from the condenser down into the heat store. The return conduit contains a throttle valve 13. The apparatus can also be provided with a circulation system for non-condensing gases in the same way as illustrated in the embodiment according to FIG. 2.

We claim:

1. A method for storing and removing heat in a reflux boiling direct contact heat exchange by the melting and crystallization of a bulk of heat-of-fusion storage medium in a closed system containing one or more chemical compounds, wherein the storage medium is brought into direct contact with a heat transfer medium having a density which is higher or equal to the density of the storage medium liquid phase and having insignificant solubility in the storage medium and being capable of taking up heat from the storage medium through vaporized. The vaporization, which comprises vaporizing the heat transfer medium [,] in the bulk of the storage medium, thereby transferring said heat transfer medium to a vapor space above the storage medium until an equilibrium is attained between the heat transfer medium liquid phase in the storage medium and its vapor in the vapor space without solidification of the surface layer, and removing the heat from the system by the reflux condensation of the vapor in the vapor space.

2. The method of claim 1, and further including the steps of supplying substantially calcium chloride hexahydrate as the storage medium and supplying a heat transfer medium selected from the group consisting of trifluorotrichloroethane and bromochlorodifluoromethane.

3. The method of claim 1, and further including the steps of supplying Glauber's salt as the storage medium and octafluorocyclobutane as the heat transfer medium.

4. An apparatus for storing and removing heat in a reflux boiling direct contact heat exchange including a closed system for melting and crystallization of a bulk of heat-of-fusion storage medium which comprises:

a container means containing a storage zone and a vapor zone, said storage zone containing a storage medium which is capable of existing in a solid or liquid phase, and a heat transfer medium said heat transfer medium having negligible solubility in the storage medium and a density which is higher than or equal to the density of the storage medium liquid phase, said vapor zone communicating with said storage zone, indirect heat exchange means disposed in said storage zone for transferring heat from a heat exchange fluid to said storage medium in the solid phase for converting at least a portion of said solid phase to a liquid phase and converting the heat transfer medium in the bulk of the storage medium to a vapor state without solidification of the surface layer, and condenser means disposed in said vapor zone for removing heat from said vapor state.

5. The apparatus as claimed in claim 4, wherein the vapor zone includes a conduit for transporting vapor to the condenser and by a return conduit for conveying the condensate from the condenser to the storage zone.

6. The apparatus as claimed in claim 5, characterized in that a compressor is arranged in the conduit for increasing the vapor pressure before the condenser, and a throttle valve is disposed in the return conduit.

7. A method for storing and removing heat by the melting and crystallization of a heat-of-fusion storage medium in a closed system containing one or more chemical compounds, wherein the storage medium is brought into direct contact with a heat transfer medium having a density which is higher or equal to the density of the storage medium liquid phase and having insignificant solubility in the storage medium and being capable of taking up heat from the storage medium through vaporization, which comprises vaporizing the heat transfer medium, in the storage medium, thereby transferring said heat transfer medium to a vapor space above the storage medium until an equilibrium is attained between the heat transfer medium liquid phase in the storage medium and its vapor in the vapor space, removing the heat from the system by the reflux condensation of the vapor in the vapor space, and recirculating non-condensing gases in the system through the storage medium.

8. An apparatus for storing and removing heat from a closed system by melting and crystallization of a heat-of-fusion storage medium which comprises a container means containing a storage zone and a vapor zone, said storage zone containing a storage medium which is capable of existing in a solid or liquid phase, and a heat transfer medium said heat transfer medium having negligible solubility in the storage medium and a density which is higher than or equal to the density of the storage medium liquid phase, said vapor zone communicating with said storage zone, indirect heat exchange means disposed in said storage zone for transferring heat from a heat exchange fluid to said storage medium in the solid phase for converting at least a portion of said solid phase to a liquid phase and converting the heat transfer medium to a vapor state and condenser means disposed in said vapor zone for removing heat from said vapor state, and recirculating means for recirculating non-condensing gases through the storage zone including a conduit provided with a pump connecting the vapor zone with the storage zone.

* * * * *